Patented Aug. 13, 1940

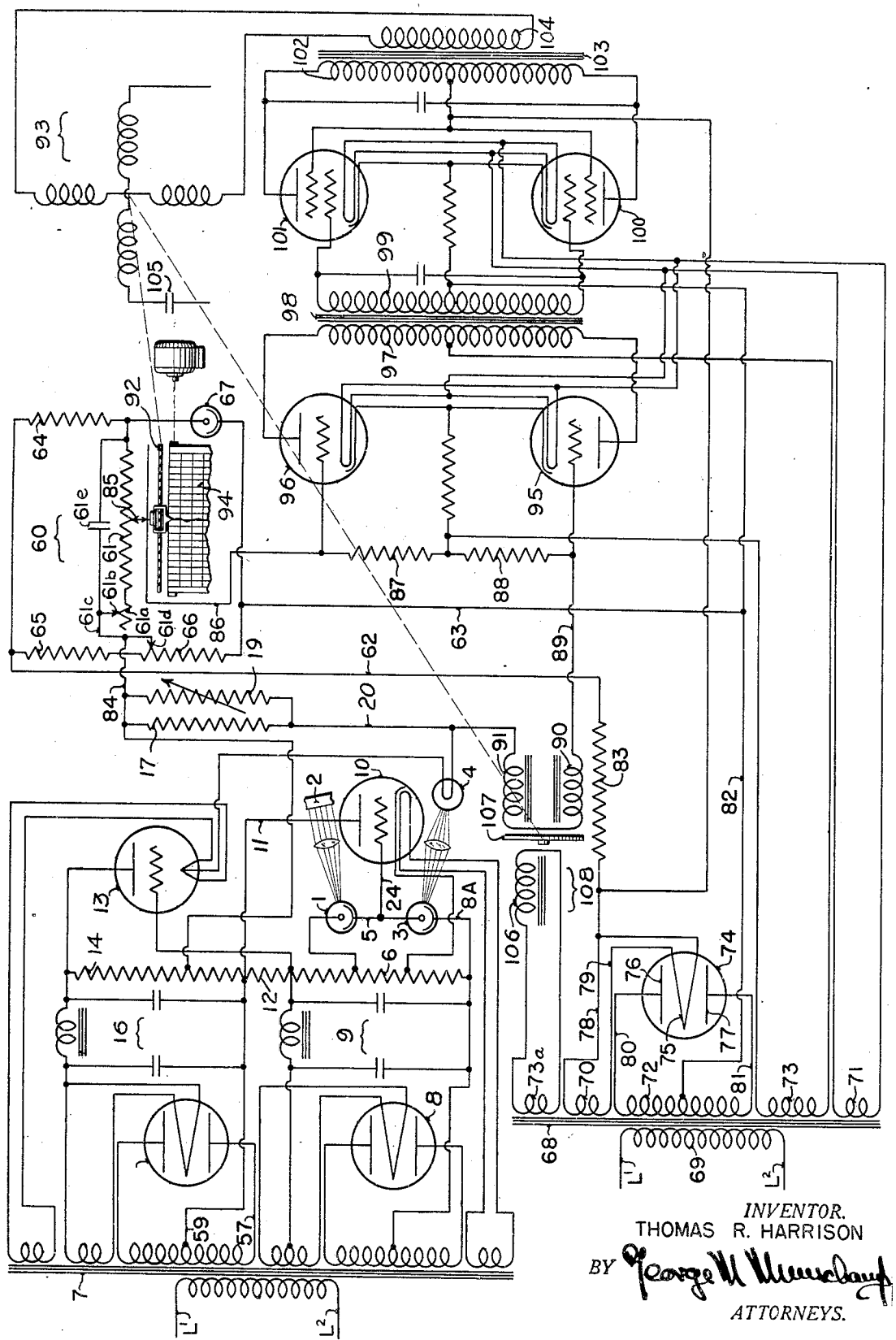

2,211,114

UNITED STATES PATENT OFFICE 2,211,114

CONTROL APPARATUS

Thomas R. Harrison, Wyncote, Pa., assignor to The Brown Instrument Company, Philadelphia, Pa., a corporation of Pennsylvania Original application May 29, 1937, Serial No. 145,637. Divided and this application March 1, 1938, Serial No. 193,259

6 Claims. (Cl. 171—229)

This invention is directed to apparatus for producing a constant source of direct current potential from a commercial source of electrical current.

The present invention is a division of my prior application Serial No. 145,637, filed May 29, 1937 for Measuring and control apparatus, which discloses various arrangements for recording and/or controlling temperature variations in incandescent bodies.

The various arrangements disclosed in my prior application were devised by me with the general object in view of providing radiant energy responsive apparatus for ascertaining and continuously recording and/or controlling temperature variations in incandescent bodies.

The apparatus claimed herein is an arrangement embodying my invention in which a constant source of direct current potential is produced from a varying commercial source of electrical current. There are many instances where a constant potential is necessary for the operation of mechanism, for example, in potentiometric measuring circuits and heretofore constant voltage batteries have been employed for this purpose. Although a battery is theoretically a satisfactory source of constant direct current potential, batteries have well known disadvantages for commercial applications which render them unfit for use in some cases. For example, batteries are expensive and must be replaced periodically, and in applications where a constant potential of the order of 50 volts or more is required the number of batteries needed comprise a bulk of such dimensions as to prohibit or discourage their use.

Accordingly, it is an object of my present invention to provide a simple and effective arrangement for producing a constant source of direct current potential from a commercial source of varying electrical current.

A further and more specific object of the invention is to provide apparatus for producing a constant source of direct current potential which is simple and compact in construction and requires a minimum of attention while in operation.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

In the single figure of the drawing, I have illustrated, more or less diagrammatically, the use of the apparatus of my present invention in a photoelectric pyrometer in which a photoelectric cell 1 is arranged to receive light from the interior of a furnace or from an incandescent body 2, and a second photoelectric cell 3 is arranged to receive light from a lamp 4, the illumination of which is adapted to be controlled by means responsive to the relative conductivities of the two photoelectric cells. The photoelectric cells are arranged in an electrical bridge circuit and as the temperature of the incandescent body varies, the illumination of lamp 4 is varied until the illumination on the two photoelectric cells is balanced. The magnitude of the lamp energizing current will then be a measure of the magnitude of the condition.

While the apparatus of my present invention has been illustrated in connection with a photoelectric pyrometer it will be apparent to those skilled in the art that it may be adapted with equal facility to many other applications wherein a constant source of direct current potential is desired. The particular features of the photoelectric pyrometer, thus, comprise no part of my present invention, and, accordingly, will be only briefly described herein. A detailed description of the photoelectric pyrometer illustrated is given in my prior application Serial No. 145,637 referred to above.

As illustrated in the drawing the two photoelectric units are connected in series relation by a conductor 5 and the series arrangement is connected across a suitable portion of a voltage divider 6. The voltage divider 6 is energized with direct current derived from alternating current supply lines $L^1$ and $L^2$ through the medium of a combination step-up and step-down transformer 7, and a full wave rectifier 8. A filter 9 may also be desirably employed between the full wave rectifier 8 and the voltage divider 6 for insuring that a steady direct current voltage substantially free from alternating components is maintained across the divider.

The voltage divider 6 also supplies energizing voltage to the anode circuit of an electronic valve 10 shown as a heater type triode. The valve 10 has its anode connected to the positive terminal of the divider 6 by a conductor 11 in which a resistor 12 is inserted, and its cathode connected to a point on the divider midway between the points of connection of the photoelectric units thereto.

The control grid of valve 10 is connected to the conductor 5 between the two photoelectric units.

The lamp 4 is connected in the output circuit of an electronic valve 13 which is shown as a filament type triode and receives energizing anode voltage from a voltage divider 14. The voltage divider 14 is energized with direct current derived from the alternating current supply lines L¹ and L² through the medium of the transformer 7, a full wave rectifier valve 15, and a filter 16. As illustrated, the anode of valve 13 is connected to the positive terminal of the voltage divider 14, and a center point on the filament cathode is connected to a point on the voltage divider which is negative with respect to the point of connection of the anode thereto and has connected in circuit therewith the filament of lamp 4 and a resistor 17. The lamp 4 is thus arranged to be energized by the anode current flow through the valve 13. As shown, the control grid of valve 13 is connected to the lower end of resistor 12, the upper end of which is connected to the negative terminal of divider 14, so that as the flow of anode current through the valve 10 varies in response to a change in illumination on the photoelectric unit 1, the anode current through lamp 4 is varied accordingly to balance the illumination on the two photocells.

Since the current which passes through the lamp 4 also passes through the resistor 17, a potential drop is maintained across the resistor 17 which varies in accordance with the illumination received by the photoelectric cell 1 and thereby in accordance with the temperature of the incandescent body. This potential drop is opposed to and normally balanced by a measured part of a constant potential drop maintained across a slidewire resistor 61 by a voltage compensating bridge circuit 60. The importance of maintaining the potential drop across the resistor 61 constant and independent of changes in line voltage will be readily appreciated when it is understood that the voltage drop across resistor 61 is employed as a standard with which the voltage drop across resistor 17 is compared. Any change in voltage across the slidewire resistor 61 is, therefore, not permissible since such change would obviously affect the calibration and stability of operation of the instrument.

The present invention is particularly directed to the voltage compensating bridge 60 which will now be described in detail. As illustrated the bridge 60 is energized from a suitable direct current source through conductors 62 and 63 connected to one pair of conjugate points, and includes resistors 64, 65, and 66 as three of its arms, and a glow discharge tube 67 as the remaining arm. The slidewire resistor 61 is connected to the other set of conjugate points. The glow discharge tube 67 comprises two spaced electrodes in a suitable envelope containing inert gas at a pressure such that the tube has a substantially constant drop thereacross when in a continuously conducting state. The resistor 64 is desirably so proportioned that the voltage drop across the glow discharge tube is adjusted to the proper operating value, at which adjustment the voltage across the glow discharge tube will vary only slightly as the voltage of the source changes. By properly proportioning the resistors 64, 65, and 66, for example, by making the resistor 65 large in comparison to resistors 64 and 66, I have found the potential drop across the resistor 66 may be made to vary by the same amount that the potential drop across the glow discharge tube does for the same change in the voltage of the source. Thus, as the line voltage changes, the potential of both ends of the slidewire resistor 61 will rise and fall simultaneously in unison with the line voltage change with the result the voltage drop across the slidewire resistor will remain constant.

In commercial applications it is usually desirable to provide means for facilitating the necessary calibrating and adjusting operations, and as shown means have been provided especially for this purpose. As shown a resistor 19 is connected in shunt to the resistor 17 for adjusting the potential drop across the latter to a desirable value and suitable means have been provided in the bridge circuit 60 for adjusting the potential drop across the slidewire resistor 61 to a correspondingly desirable value. The latter means includes a resistor 61a connected in series with the resistor 61 and a cooperating contact 61b. Contact 61b is connected by a conductor 61c to a contact 61d which is arranged to be moved along the bridge resistor 66 for precisely adjusting the voltage compensation of the bridge 60. I have found that by varying the position of contact 61d along resistor 66 full compensation for line voltage variations, or under compensation or over compensation may be had as desired. Means have also been provided in the form of a condenser 61e connected in shunt to resistors 61 and 61a for filtering out any alternating components in the current flow through resistor 61.

By way of illustration it is noted that when the discharge tube 67 is of the commercial type 874 and the voltage impressed on the bridge network 60 is of the order of 330 volts, the resistors 61, 61a, 64, 65, and 66 may have values of 4,000 ohms, 1,500 ohms, 6,000 ohms, 40,000 ohms, and 1,000 ohms, respectively. When resistors 61 and 61a are adjusted to a total value of 5,000 ohms, the current flow therethrough will be 13.9 milliamperes and will remain constant at this value even with wide variations in the voltage impressed on the bridge network. The potential drop across resistors 61 and 61a will then be maintained constant at 69½ volts. I have found that within limits determined by the maximum value of current that the tube 67 can safely conduct and the lowest voltage impressed on the terminals of the tube at which it will be conductive, the potential drop across resistors 61 and 61a is independent of the voltage impressed on the bridge network and will remain constant in value. In the arrangement illustrated, I have found that safe and dependable operation is had with variations as large as ±20% in the voltage impressed on the bridge network.

It will be apparent the potential drop maintained across resistors 61 and 61a may be adjusted to any desired value by properly choosing tube 67 and properly proportioning the resistors 61, 61a, 64, 65 and 66. For example, the potential drop across resistors 61 and 61a may be made a suitably small value whereby the network 60 may be employed in supplying current to a potentiometric network, or the like, used in precision measurements of thermoelectric or other voltages of minute magnitude.

The source from which the voltage compensating bridge is energized may be any direct current source of voltage and as shown in the drawing it may be energized through a suitable rectifier circuit from a transformer 68 which is a combination step-up and step-down transformer and comprises a line voltage primary winding 69 connected to the supply lines L¹ and L², low voltage secondary windings 70 and 71, and high voltage secondary windings 72, 73 and 73a. The rectifier circuit referred to may be similar to the rectifier circuits including the rectifier valves 8 and 15, and includes a rectifier valve 74 having a filament cathode 75 connected by conductors 78 and 79 to the terminals of the low voltage transformer secondary winding 70 and receiving energizing current therefrom. The anode plates 76 and 77 of valve 74 are connected by conductors 80 and 81 to the terminals of the transformer secondary winding 72. A center tap on the secondary winding 72 constitutes the negative terminal and the filament 75 constitutes the positive terminal of the rectifier. The positive terminal of the rectifier is connected to one energizing terminal of the voltage compensating bridge 60 through a suitable resistor 83 by the conductor 62 and the negative terminal thereof is connected by the conductor 63 to the other energizing terminal of the bridge. If desired, a suitable filter may be connected between the rectifier and the voltage compensating bridge 60, but I have found that it is not necessary to supply pure direct current voltage to the bridge 60 in this arrangement and that very satisfactory operation is had when full wave rectified pulsating current is supplied to the bridge.

As noted hereinbefore the potential drop across the resistor 17 is opposed to and normally balanced by a measured part of the potential drop across the slidewire resistor 61. To this end a contact 85 slidable along resistance 61 is mounted on a carriage carried by a shaft 92, which in turn, is disposed adjacent to the resistor 61. The shaft 92 may desirably be a rod having a spiral groove thereon and is connected in any convenient manner to the shaft of a reversible electrical motor 93. The motor 93 is adapted to be energized for rotation in one direction or the other whenever unbalance occurs between the opposed potential drops across the resistors 17 and 61 in one direction or the other, and is adapted to effect an adjusting movement of the contact 85 along the resistor 61 in the proper direction until the effective potential drop across the resistor 61 is equal to that across the resistor 17. The unbalance between said potential drops having been reduced to zero the motor will come to rest with the contact 85 at a new position along the slidewire 61, which position will then be a measure of the intensity of illumination on the photoelectric unit 1 and thereby of the temperature of the incandescent body 2.

Desirably, a pen, mounted on the carriage which carries the potentiometer contact 85 is arranged to cooperate with a recorder chart 94, and to thereby provide a continuous record of the temperature of the incandescent body. The recorder chart 94 is adapted to be driven in any convenient manner, as for example, by a unidirectional motor so that a record of the temperature of the incandescent body 2 will be had as a continuous line on the chart.

The manner in which the reversible electrical motor 91 is selectively controlled for rotation in one direction or the other in response to unbalance between the potential drops across resistors 17 and 61 comprises no part of the present invention and will only be briefly described herein. As shown, the resistor 17 is connected in a series circuit with the slidewire resistor 61 which may be traced from the negative side of resistor 17, conductor 84 to the negative end of slidewire resistor 61, contact 85, conductor 86, resistors 87 and 88, conductor 89, a pair of induction generator windings 90 and 91, and conductor 20 to the positive terminal of resistor 17. The point of connection of resistors 87 and 88 is connected through a cathode biasing resistor to the cathodes of a pair of electronic valves 95 and 96, and opposite ends of the resistors are connected to the valve control grids, respectively.

The valves 95 and 96 are heater type triodes and are employed to convert the unbalanced direct current flows through the resistors 87 and 88 into alternating currents which may be further amplified and employed to selectively control the rotation and direction of rotation of the motor 93. Specifically, the anodes of valves 95 and 96 are connected to opposite terminals of the primary winding 97 of a transformer 98 and a center tap on the transformer primary winding is connected to one terminal of the transformer secondary winding 73. The other terminal of the secondary winding is connected to the negative end of the cathode biasing resistor in the input circuits of valves 95 and 96. Thus alternating voltage is supplied to the anode circuits of the valves 95 and 96 and the pulsating current conducted by these valves is adapted to be varied by the flow of direct current through the resistors 87 and 88. The result is that pulsating anode current will flow through the transformer primary winding 97 which will vary in phase and magnitude in accordance with the direction and magnitude of the direct current flow through the resistors 87 and 88, and thereby an alternating voltage will be induced in the secondary winding 99 of the transformer 98 which will also vary in phase and amplitude accordingly.

The alternating voltage so induced in the transformer secondary winding 99 is impressed on the input circuits of a second pair of electronic valves 100 and 101. The valves 100 and 101 are heater type tetrodes and are shown connected in push-pull relation. The anodes of valves 100 and 101 are energized with direct current voltage from the full wave rectifier including the valve 74 and are connected to opposite terminals of the primary winding 102 of a transformer 103 having a secondary winding 104. A center tap on the primary winding 102 is connected to the positive terminal of the rectifier and the cathodes of valves 100 and 101 are connected through a biasing resistance to the negative terminal of the rectifier. The terminals of the transformer secondary winding 104 are connected to one phase winding of the motor 93 and the other phase winding of the motor is connected to the alternating current supply lines through a suitable condenser 105.

With the arrangement described, it will be apparent to those skilled in the art that depending upon the direction of the potentiometric unbalanced current flow through the resistors 87 and 88, the motor will be selectively energized for rotation in one direction or the other, the motor speed being directly dependent upon the magnitude of the unbalance current flow.

In order that the speed of motor 93 may be as great as possible during rebalancing without overshooting, an induction disc generator 108 having a pair of opposed windings 90 and 91 connected in series relation with the resistors 17, 61, 87 and 88 and a winding 106 energized from the transformer secondary winding 73a, is provided to ensure that the motor speed and rate of change of its speed is substantially proportional to the extent of unbalance. The generator 108 also includes a rotatable aluminum or copper disc 107 which may be driven directly from the motor shaft or through suitable gearing, as desired. The windings 90 and 91 are so arranged with respect to the winding 106 and the disc 107 that on rotation of the latter a voltage will be induced across the terminals of the windings 90 and 91, which voltage is in opposition to the unbalanced voltage between the potential drops across the resistors 17 and 61 and is effective to permit maximum speed of operation of the motor 93 without overshooting occurring.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. An impedance, physically stationary means for maintaining a constant voltage across said impedance comprising a varying alternating voltage source, means for rectifying said source to produce a direct current varying in proportion to the variation of said source, a bridge circuit adapted to be energized by said direct current including impedances in three of its arms and a gaseous discharge tube in its remaining arm, and a connection between one pair of bridge conjugate points including said first mentioned impedance.

2. An impedance, means for maintaining a constant voltage across said impedance comprising a varying direct current voltage source, a bridge circuit including impedances in three of its arms and a gaseous discharge tube in its remaining arm, a connection between one pair of bridge conjugate points including said first mentioned impedance, and a connection between the remaining pair of bridge conjugate points including said source.

3. An impedance, means for maintaining a constant voltage across said impedance comprising a varying direct current voltage source, a bridge circuit including impedances in three of its arms and a gaseous discharge tube in its remaining arm, one of said bridge impedances being large in proportion to the other impedances mentioned, a connection between one pair of bridge conjugate points including said first mentioned impedance, and a connection between the remaining pair of bridge conjugate points including said source.

4. Means for maintaining a constant voltage across an electrically conductive device comprising a varying direct current voltage source, a bridge circuit including impedances in three of its arms and a gaseous discharge tube in its remaining arm, a connection between one pair of bridge conjugate points and said device, and a connection between the remaining pair of bridge conjugate points including said source.

5. Means for maintaining a constant voltage comprising a varying direct current voltage source, a bridge circuit having a pair of energizing terminals and a pair of terminals the difference of potential between which it is desired to maintain constant, a connection between said last mentioned terminals, a connection between said source and said bridge energizing terminals, said bridge circuit including impedances in three of its arms and a gaseous discharge tube in its remaining arm.

6. An impedance, means for maintaining a constant voltage across said impedance comprising a varying alternating voltage source, means for rectifying said source to produce a direct current varying in proportion to the variation of said source, a bridge circuit having a pair of conjugate points on which said direct current is applied and including impedances in three of its arms and a gaseous discharge tube in its remaining arm, and a connection between the remaining pair of bridge conjugate points including said first mentioned impedance.

THOMAS R. HARRISON.